United States Patent
Seibt

(10) Patent No.: US 11,123,248 B2
(45) Date of Patent: Sep. 21, 2021

(54) AIRPLANE MOBILITY SYSTEM FOR PASSENGERS

(71) Applicant: AIRBUS OPERATIONS GMBH, Hamburg (DE)

(72) Inventor: Christian Seibt, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 291 days.

(21) Appl. No.: 15/955,316

(22) Filed: Apr. 17, 2018

(65) Prior Publication Data

US 2018/0228679 A1 Aug. 16, 2018

Related U.S. Application Data

(63) Continuation of application No. PCT/EP2016/074913, filed on Oct. 18, 2016.

(30) Foreign Application Priority Data

Oct. 19, 2015 (DE) .......................... 102015117767.6

(51) Int. Cl.
*B64D 11/02* (2006.01)
*A61G 7/10* (2006.01)

(52) U.S. Cl.
CPC ......... *A61G 7/1007* (2013.01); *A61G 7/1015* (2013.01); *A61G 7/1034* (2013.01);
(Continued)

(58) Field of Classification Search
CPC .. A61G 7/1007; A61G 7/1042; A61G 7/1015; A61G 7/1051; A61G 7/1034; A61G 2220/10; B64D 11/02
See application file for complete search history.

(56) References Cited

U.S. PATENT DOCUMENTS

| 4,266,305 A | 5/1981 | Kavaloski et al. |
| 4,606,082 A * | 8/1986 | Kuhlman ................ A61G 5/00 280/304.1 |

(Continued)

FOREIGN PATENT DOCUMENTS

| DE | 4417256 A1 | 11/1995 |
| WO | 8809159 A1 | 12/1988 |

(Continued)

OTHER PUBLICATIONS

International Searching Authority, International Search Report for International Application PCT/EP2016/074913 dated Dec. 19, 2016.

*Primary Examiner* — Brian M O'Hara
*Assistant Examiner* — Keith L Dixon
(74) *Attorney, Agent, or Firm* — Jenkins, Wilson, Taylor & Hunt, P.A.

(57) ABSTRACT

The disclosure refers to an airplane's own mobility system. For supporting a passenger with reduced mobility on board an airplane and for simplifying as much as possible the use of a toilette, a mobility system for passengers with reduced mobility is provided. The mobility system includes an onboard toilette spatial unit having an entrance zone, an entrance door, and a toilette using zone with a toilette. Moreover, a movement device with a passenger carrying equipment is provided, which is moveable at least from the entrance zone to the toilette using zone and supported in the ceiling area. The passenger carrying equipment includes a seat device enabling a passenger a seat like position. For using the toilette, a passenger is movable back and forth with the movement device from the entrance zone to the toilette using zone.

14 Claims, 9 Drawing Sheets

(52) U.S. Cl.
CPC ......... *A61G 7/1042* (2013.01); *A61G 7/1051* (2013.01); *A61G 7/1059* (2013.01); *B64D 11/02* (2013.01); *A61G 2220/10* (2013.01)

(56) References Cited

U.S. PATENT DOCUMENTS

| | | | |
|---|---|---|---|
| 5,511,256 A | 4/1996 | Capaldi | |
| 6,637,610 B1* | 10/2003 | Cheeseboro | A61G 7/1067 212/327 |
| 2003/0084508 A1* | 5/2003 | Faucher | A61G 7/1015 5/81.1 R |
| 2005/0115914 A1* | 6/2005 | Chepurny | A61G 7/1015 212/328 |
| 2006/0060704 A1* | 3/2006 | Lavie | A61G 3/001 244/118.5 |
| 2007/0294823 A1* | 12/2007 | Hay | A61G 7/1019 5/86.1 |
| 2010/0051746 A1* | 3/2010 | Law | B64D 11/06 244/118.6 |
| 2010/0288155 A1* | 11/2010 | Chepurny | A61G 7/1042 104/89 |
| 2011/0072580 A1* | 3/2011 | Imhoff | A61G 7/1042 5/85.1 |
| 2011/0126351 A1* | 6/2011 | Walker | A61G 7/1051 5/87.1 |
| 2013/0019401 A1* | 1/2013 | Faucher | A61G 7/1015 5/85.1 |
| 2014/0223661 A1* | 8/2014 | Galloway | A61G 7/1042 5/85.1 |

FOREIGN PATENT DOCUMENTS

| | | |
|---|---|---|
| WO | 0027333 A1 | 5/2000 |
| WO | 2004078088 A1 | 9/2004 |
| WO | 2014154758 A1 | 10/2014 |

* cited by examiner

AIRPLANE MOBILITY SYSTEM FOR PASSENGERS

CROSS-REFERENCE TO PRIORITY APPLICATIONS

This application is a continuation of international patent application number PCT/EP2016/074913, having an international filing date of Oct. 18, 2016, which claims priority to German patent application number DE 102015117767.6, having a filing date of Oct. 19, 2015. The content of the referenced applications is incorporated by reference herein.

TECHNICAL FIELD

The present disclosure refers to an airplane's own mobility system for passengers with reduced mobility, a cabin segment for an airplane, and an airplane.

BACKGROUND

In particular, during longer travel times with planes, provided for the transportation of passengers, there are passenger movements on board of the airplane, too. The movement of the passengers might serve, for example, to use a toilette on board of the airplane. For passengers with reduced mobility (in English also designated as PRM, Passenger with Reduced Mobility), therefore, for example, a wheelchair can be used, which is tailored for use on board of an airplane. For example, the wheelchair is foldable and can be stored in the folded condition to save space. Such a wheelchair for the use on board of an airplane, also known as Onboard Wheelchair, OBW, can for example be designed with narrower dimensions than a common wheelchair, to be for example moveable within an airplane cabin along the aisle areas. Due to the spatial situation the use of a wheelchair may be sometimes subjected to significant limitations; in particular for a passenger with reduced mobility the use of the toilette might be connected with efforts. For example, patent publication WO 2014/154758 A1 describes an additional seat device for assisting a seat change from a wheelchair to the toilette.

BRIEF SUMMARY

There may be a need to support passengers with reduced mobility on board of an airplane and for example to ease the use of the onboard toilette.

It should be noted that the aspects for mobility system described in the following apply to the cabin segment for an airplane and for the airplane.

According to an aspect, an airplane's own mobility system for passengers with reduced mobility is provided. The airplane's own mobility system comprises an on-board toilette spatial unit and a movement device. The onboard toilette spatial unit comprises an entrance zone having an entrance door, and a toilette using zone with a toilette. The movement device comprises a passenger carrying equipment, which is movable from the entrance zone to the toilette using zone, and supported in a ceiling area. The passenger carrying equipment comprises a seat device enabling a passenger a seat like position. For using the toilette, a passenger can be moved back and forth with the movement device from the entrance zone to the toilette using zone.

The "mobility system" for passengers with reduced mobility can be also designated as cabin space transport system for passengers with reduced mobility. The mobility system can be also designated as transfer system for using the toilette or as toilette transfer system. Thereby, the utilization of the toilette should not to be considered as limiting, but in a toilette room there are also other supply- and disposal assemblies, too, such as beside the toilet, the water basin, soap dispenser, etc., which can be used by the passenger with limited mobility, depending on disability with or without additional assistance.

The term "passenger with reduced mobility" refers for example to passengers, which are depending on a wheelchair. But, the term refers to passengers, too, which can independently walk but which depend on assistive devices. The reduced mobility can have various reasons, for example a physical disability of the passenger, a generally weakened condition, an age-related reduced health status, or the like. The mobility can be permanently but also temporary reduced.

The term "airplane's own" refers to a mobility system, which is permanently located on board of the airplane. The airplane's own mobility system can be designated as onboard or inboard mobility system, or as Onboard Mobility System, OMS, or Onboard Transfer System, too.

The "onboard toilette spatial unit" is also designated as lavatory or on-board toilette.

The term "entrance zone" refers to that zone of the lavatory, i.e. the toilette spatial unit, where the toilette is accommodated, and to these room zones occupied by the passenger during the use of the toilette. In other words, "toilette using zone" designates the space used by the passenger when using the toilette.

The "movement device" refers to a system with which a passenger on board of the airplane can be moved. The movement device can be designated as transport device, too. Thereby, the movement refers to the movement of the passenger on board of the airplane, i.e. the movement within the airplane in relation to the airplane. This kind of movement should be not mixed with the movement of the airplane in relation to the surrounding.

The "passenger carrying equipment" designates a device, which is capable to support a passenger, i.e. to carry, and to hold, respectively.

The "seat device" designates equipment, in which a passenger can be accommodated in a sitting position. The term "sitting" refers to a position of a passenger, in which the torso is upwards arranged, wherein the legs are angled and the feet are hanging downwards or are oriented downwards. The passenger does not obligatorily need to sit on his/her buttocks; transferring of load is for example carried out via supporting components at the spine and the thighs.

The term "supported in the ceiling area" refers to a passenger carrying equipment hanging downwards from above. Thus, the seat device is not attached to the floor and does not stand on the floor, but the load is transferred upwards, i.e. into the ceiling area.

For example, the movement device enables a passenger, which otherwise is seating in a wheelchair, to use the toilette room without the wheelchair, including the use of the toilette itself. Thereby, the seat device ensures a sufficient support, such that a passenger with reduced mobility, for example with paralyzed legs, can be supported in the seat device. For example, the passengers can cause via the arms a movement within the onboard toilette spatial unit. This means, that a wheelchair, for example an onboard wheelchair, does not need to be taken inside the onboard toilette spatial unit.

According to an example, the movement device comprises a rail, in which the passenger carrying equipment is movably supported, and which extends in the ceiling area. The rail extends in the interior space of the toilette spatial unit on the ceiling at least from an area above the entrance zone to an area above the toilette.

The term "area above the entrance zone" designates an area, which is situated for example above the door opening space (of a door which opens—into the interior room—inwards). The "area above the entrance zone" is for example located above that floor area on which a user stands, when he/she had entered the spatial unit. It is relevant that it is possible from there to reach and to use the passenger carrying equipment.

In an example the passenger carrying equipment, i.e. the seat device of the passenger carrying equipment, can be used from an area, which is directly located in front of the door opening of the onboard toilette spatial unit.

The term "above" refers for example to the vertical upwards projection of the area.

According to an example, the rail in the ceiling area extends via the area above the entrance zone into an aisle zone in front of the onboard toilette spatial unit. The passenger carrying equipment is moveable into the aisle area. Hence, the rail does not only extend within the onboard toilette spatial unit but also extends into the aisle area, i.e. from the ceiling area in the onboard toilette into the ceiling area of the aisle area. A passenger located in a wheelchair can already change in the aisle area from the wheelchair into the seat device to be subsequently moved with the seat device into the onboard toilette spatial unit. For example, this enables reseating from the wheelchair, for example an OBW, not directly in vicinity of the toilette door, but in an aisle area, where the wheelchair can remain via the time of using the toilette. Thereby, the handling of the toilette door is simplified, too, in that the passenger carrying equipment can be moved into the aisle area.

According to an example, the rail in the ceiling area extends from the aisle area in front of the onboard toilette spatial unit as far as to a cabin section with at least one passenger seat. The passenger carrying equipment is moveable into the aisle area. Hence, the rail not only extends within the onboard toilette space into the aisle area unit but also extends as far as to an area of the cabin or rather the airplane's interior room, in which at least one passenger seat is provided, i.e. from the ceiling area in the onboard toilette via the ceiling area of the aisle area into the ceiling area in vicinity of the passenger seats. For example, the rail extends into an area above the seat area of a passenger seat. Thus, a passenger can already change from the passenger seat into the seat device to be subsequently moved into the onboard toilette spatial unit and to move himself/herself by the aid of the seat device in the onboard toilette spatial unit, respectively. For using the toilette, the use of a wheelchair can then be omitted.

The load transfer of the passenger carrying equipment, for example, takes place via a connection with the structure of the airplane, for example with the fuselage construction. The load transfer can be also performed via a connection with the monument or rather module, for example the toilette module.

For example, the rail extending in the ceiling area is connected to the secondary structure or directly connected to the primary structure. The primary structure designates the fuselage structure of the airplane. The secondary structure designates a subordinate structure, which is provided for the attachment of components, equipment, installations etc., for example for the connection of equipment carriers, baggage compartments, monuments, etc. The secondary structure is attached to the primary structure.

The space zone of the onboard toilette spatial unit can be also designated as WC-zone. The area in front of the onboard toilette and adjacent aisle areas can be designated as aisle-, hallway-, or passageway-zone, too. The area of the passenger seats can be also designated as seat zone.

According to an example, there are mobile partitions in the aisle area or rather the cabin area, as visual protection available to at least optically disconnect or rather shield the space area, in which the passenger changes into the seat device, from other areas.

According to an example, the onboard toilette spatial unit comprises a wash basin, and a passenger situated in the seat device can use the wash basin, too.

According to an example, the movement device comprises a moving equipment, which is movable in a horizontal direction, and from which the passenger carrying equipment is supported.

According to an example, the moving equipment comprises a movement unit, which is movable along the rail extending in the ceiling area.

According to an example, the movement unit is provided as a slide, which comprises two pairs of rolls whose axis are pivotably supported to each other via a middle part.

According to an example, the movement unit is provided as a slide, which comprises two pairs of rolls, between which a securing plate is provided, which is in operation located partially above inwards extending projections of a lower rail segment. The passenger carrying equipment is supported on the securing plate.

For example, the movement unit is an automotive slide, which is vertically supported by the rail and with which the passenger carrying equipment is moved in a horizontal direction.

The rail can be designated as transfer rail or mobility ceiling rail, too.

According to an example, the movement unit is provided as automotive slide with an electrical drive. The electronic system and the electric motors of the slide can be operated for example with storage elements for storing electrical energy. For example, the storage elements are adapted with charging interfaces, which are at the end points of the rails in contact with current sources to charge the storage elements at least if required.

But, alternatively or additional, the electronic system and the electric motor of the slide can be directly operated by an electrified rail, too.

According to an example, a control unit for the movement unit is provided on the seat device. Therewith, the supported passenger and/or an assistant are/is able to control the action procedure, i.e. to control and monitor the transfer procedure.

According to an example, the seat device is movable supported in the height.

According to an example, therefore, the movement device comprises a lifting equipment, with which the seat device is movable in a vertical direction.

According to an example, the seat device comprises a seat loop equipment, which can be temporarily mounted around a passenger.

For example, the seat loop equipment comprises two leg loops and a spine support and enables the user a seating position, provided with no covering in the buttock area, such that the use of a toilette is possible.

Seat loop equipment can be for example mounted around a seating passenger, in that for example the loop device can be drawn through underneath the tights. Therewith, a seating passenger can be provided with a flexible supporting frame to lift the passenger out of the seat and to subsequently arrange the transfer into the onboard toilette spatial unit.

According to an example, the seat device comprises two anchoring devices for temporarily downwardly anchoring the seat device at two spaced bearing points. The bearing points are provided in the floor area and/or at a seat structure, and/or at a monument structure, and/or at a cabin wall.

According to the an aspect, there is provided a cabin segment for an airplane. The cabin segment comprises at least a part of a lounge unit, comprising a lounge area with a plurality of passenger seats. Moreover, the cabin segment comprises at least one aisle area for movement of the passenger within the cabin segment. Furthermore, an onboard toilette spatial unit is provided with a toilette. An airplane's own mobility system according to one of the precedingly described examples is provided for the onboard toilette spatial unit. A passenger with reduced mobility is enabled by the airplane's own mobility system to use the toilette during the stay in the cabin segment.

According to an example, the cabin segment is part of a cabin structure of an airplane.

According to an aspect, furthermore, an airplane is provided, comprising a lounge area with a plurality of passenger seats, as well as an airplane's own mobility system according to one of the preceding described examples. A passenger with reduced mobility is enabled by the airplane's own mobility system to use the toilette during the stay in the cabin segment.

The lounge area is a part of an airplane's interior room.

According to an example, the airplane is an airplane and the lounge area is formed by a cabin area. The airplane's own mobility system is arranged in the cabin area.

According to another aspect, a mobility system is provided, with which help a passenger can be moved from an entrance area of an onboard toilette to a toilette for using the toilette. For this purpose, a construction is provided which suspends from above, which is mounted around the passenger as kind of carrying and restraint straps, respectively, and in which he/she is sufficiently supported. Thus, the passenger can be moved within the moving space provided therefore, for example from the entrance area of a toilette into an area in direct proximity of the toilette for using same. For example, the mobility system can be provided in aisle areas, or can extend into the passenger seats. Thereby, a passenger with reduced mobility can be enabled to use the toilette, without the need to sit the passenger for this purpose into a wheelchair, to be subsequently laboriously lifted out of the wheelchair onto the toilette seat. Rather, the seat device suspending from above must be merely mounted to the passenger.

It should be noted that the features of the embodiments of the system also apply to embodiments of the cabin segment, as well as of the airplane and vice versa. Moreover, those features may be freely combined with each other, too, where this is not indicated explicitly.

These and further aspects of the disclosure will be apparent with reference to and with cross-reference to the following implementations.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

In the following, exemplary embodiments are described in more detail with reference to the attached drawings. It is shown in.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1A:
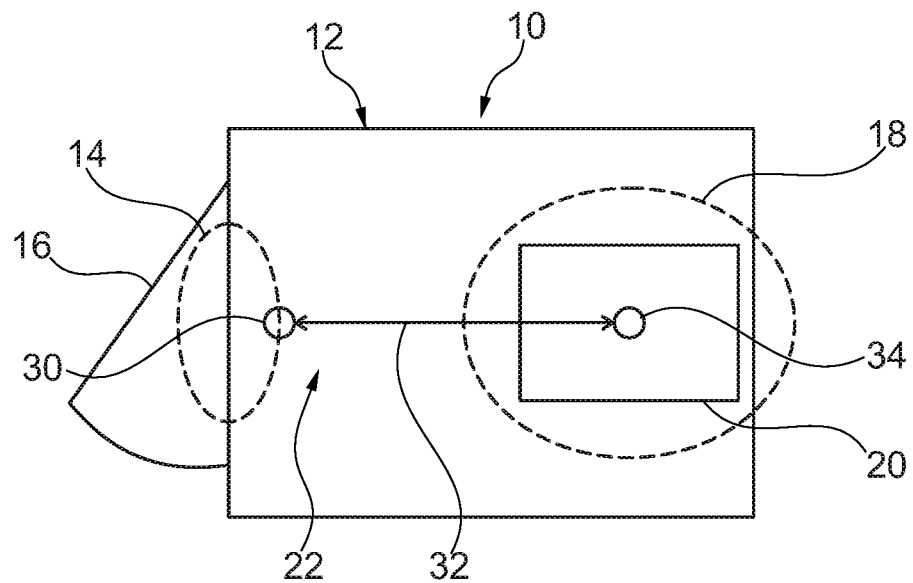
FIG. 1A shows a schematic horizontal section through an example of an airplane's own mobility system as functional schema.
Figure 1B:
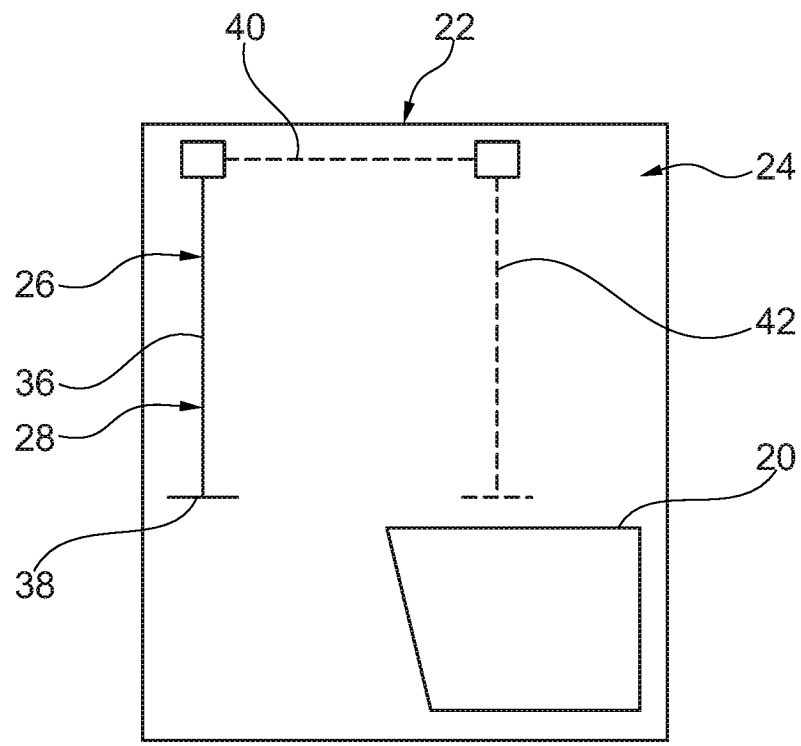
FIG. 1B shows a vertical section through the mobility system of FIG. 1A.

FIG. 1A and FIG. 1B show an example of an airplane's own mobility system 10 for passengers with reduced mobility. The mobility system 10 comprises an onboard toilette spatial unit 12, which comprises an entrance zone 14 with an entrance door 16 and a toilette using zone 18 with a toilette 20. Moreover, a movement device 22 is provided, being supported in the ceiling area 24, and comprising a passenger carrying equipment 26. FIG. 1A shows a schematic horizontal section, and FIG. 1B a schematic vertical section.

The passenger carrying equipment 26 comprises a seat device 28, which enables a passenger a seat like position. For using the toilette 20 a passenger can be moved back and forth with the movement device 22 from the entrance zone 14 to the onboard toilette using zone 18. According to an option it is provided that the seat device 28 comprises a seat loop equipment 29 (see FIG. 2), which can be temporarily mounted around a passenger.

In FIG. 1A the movement of the passenger is schematically indicated with a first point 30, which is located in the region of the entrance zone 14, and a movement arrow 32, as well as a second point 34, which is located in the toilette using zone 18. In FIG. 1B the position in the region of the entrance zone 14 is schematically indicated with a first, continuous vertical line 36, and cross line 38 located at the lower end, indicates the seat device 28. A first, horizontal broken line 40 indicates the movement direction from the entrance zone 14 to the toilette using zone 18. A second, broken vertical line 42 indicates the position, when the user, i.e. the passenger has been moved into the area of the toilette using zone.

Figure 2:
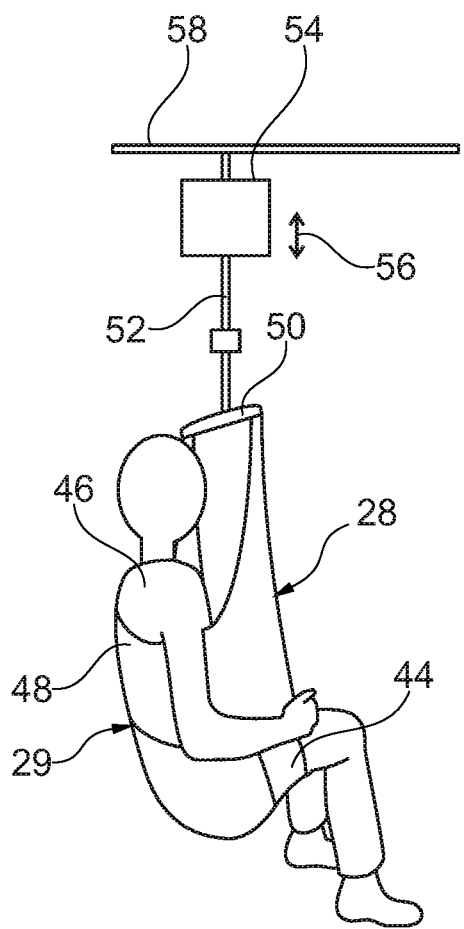
FIG. 2 is a schematic illustration of an example of a movement device.

In FIG. 2 an illustration of an example of the seat device 28 is shown. The seat device 28 comprises, for example, a first loop-like area 44, which supportly encompasses the thighs of a passenger 46. A second supporting area 48 is provided in the spine area of the passenger 46 to provide the passenger here with sufficient support. The loop like construction is supported, for example, by a mounting bracket 50, which in turn is supported from above by a supporting construction 52. In FIG. 2 a lifting equipment as option is indicated with a rectangular 54, with which the seat device 28 can be moved in a vertical direction, indicated with a double arrow 56.

According to an example, the movement device 22 comprises a rail 58, in which the passenger carrying equipment 26 is movably supported, and which extends in the ceiling area. For example, the rail extends in the interior space of the toilette spatial unit on the ceiling at least from an area above the entrance zone 14 as far as to an area over the toilette 20.

Figure 3:
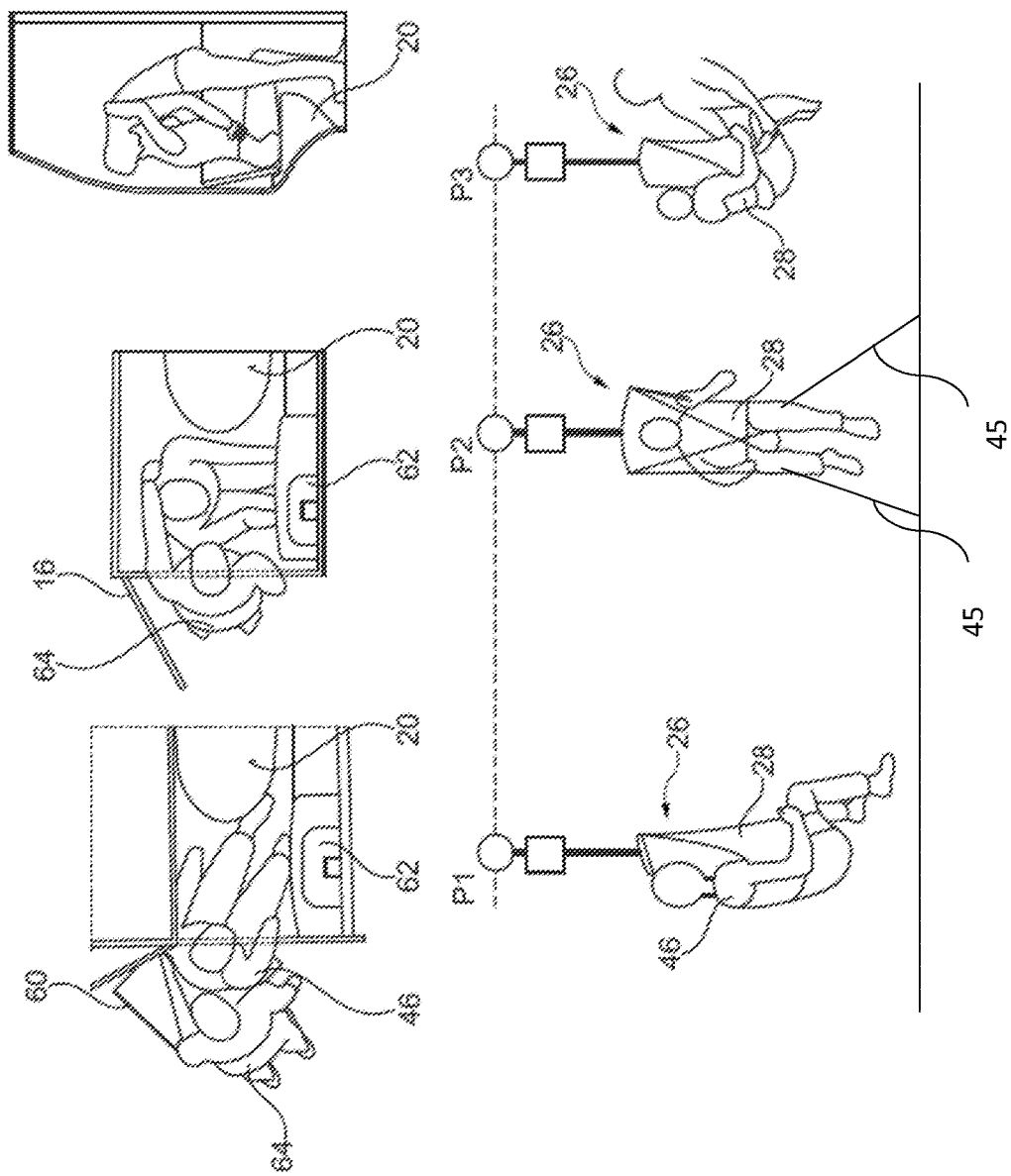
FIG. 3 is a schematic illustration of a motion sequence during the use of an example of an airplane's own mobility system.

FIG. 3 schematically shows a motion sequence. In a first position P1 the passenger with reduced mobility is located in the area of the entrance zone 14. For example, the passenger can be transported by a wheelchair 60 into the seat device 28, or rather the seat device 28 can be mounted around the passenger. Subsequently, the passenger can be moved into a second position P2, for example, along the rail 58 (not shown). In the second position P2 the passenger with reduced mobility is located in direct proximity to a wash basin 62 to use it. Subsequently, the passenger with reduced mobility can still be moved into a third position P3, in which he/she is located directly above the toilette 20. In the upper area of the schematic illustration a kind of plan view is shown. For example, the passenger 46 can be assisted by an assistant 64. For example, the assistant 64 can initiate the movement along the movement device. However, this can take place by control, too. In the right part of the series of pictures it is shown how the assistant can be helpful for drapery of the clothes of the passenger with reduced mobility.

In the series below, it is schematically illustrated how a passenger 46 is supported by the movement device, i.e. by the seat device 28 of the passenger carrying equipment 26.

FIG. 3 shows as an option, that, in an example, the seat device comprises two anchoring devices 45 to temporarily downwardly anchor the seat device at two spaced bearing points (not shown in detail). The bearing points are located, for example, in the floor area, for example, the temporary fixation is performed via seat rails. For example, the bearing points can be also provided at a seat structure, at a monument structure, or at a cabin wall.

Figure 4:
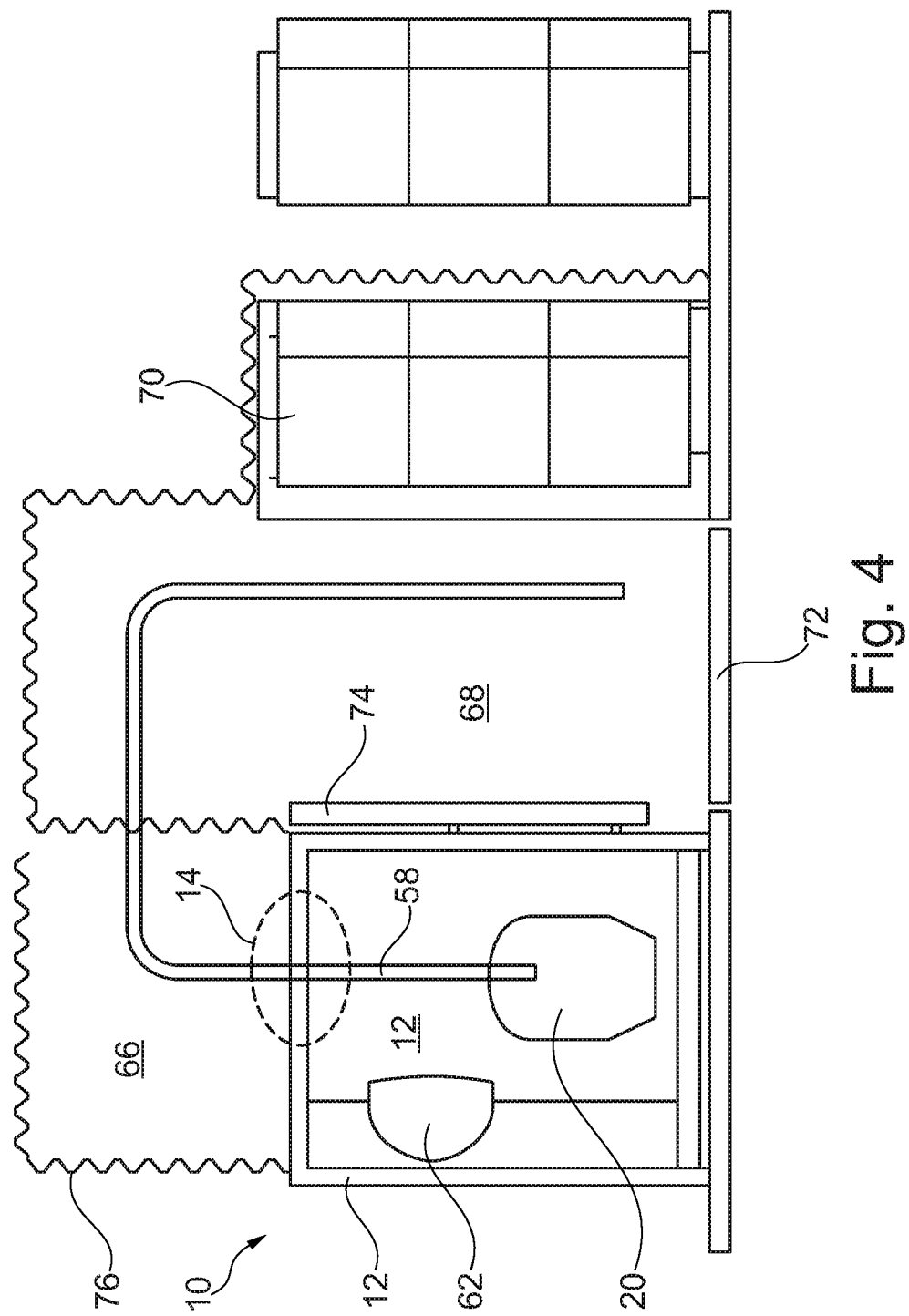
FIG. 4 shows an example of an airplane's own mobility system in relation to a cabin segment in form of a horizontal section-like, schematic illustration.

FIG. 4 shows in a plan-view-like schematic illustration a further example of the airplane's own mobility system 10. The onboard toilette spatial unit 12 is, for example, in addition to the toilet 20 also equipped with the afore mentioned wash basin 62. According to one option shown in FIG. 4, the rail 58 in the ceiling area extends via the area above the entrance zone 14 into an aisle zone 66 in front of the onboard toilette spatial unit 12. Thereby, the passenger carrying equipment can be moved into the aisle area 66.

In a further option, also shown in FIG. 4, the rail 58 extends in the ceiling area from the aisle zone 66 in front of the onboard toilette spatial unit 12 as far as to a cabin area 68 with at least one passenger seat 70. Thereby, the passenger carrying equipment 26 can be moved into the cabin area 68. Thereby, it is possible with the passenger carrying equipment 26, for example to directly and already support, and to move a passenger at the passenger seat via the aisle area 66 into the onboard toilette spatial unit 12, for using there, for example, the toilette.

For example, the mentioned option of the rail elongated as far as to the passenger seat area can be arranged in the area of an entrance door 72. In this area, which must be kept free for entrance and exit during flight operation, an attendant or also a further assistant can be seated on a stowable seat 74 provided therefore, for example a Cabin Attendant Seat, CAS, to assist the passenger with reduced mobility.

Moreover, as further option it is indicated in FIG. 4 that the individual zones, i.e. the zone of the aisle area 66 or also the zone of the cabin area 68 in front of the passenger seats 70, which might be provided for example for passengers with reduced mobility, can be shielded at least visually from the remaining spatial units by curtain-like partitions or by other mobile temporary partitions 76.

Figure 5:
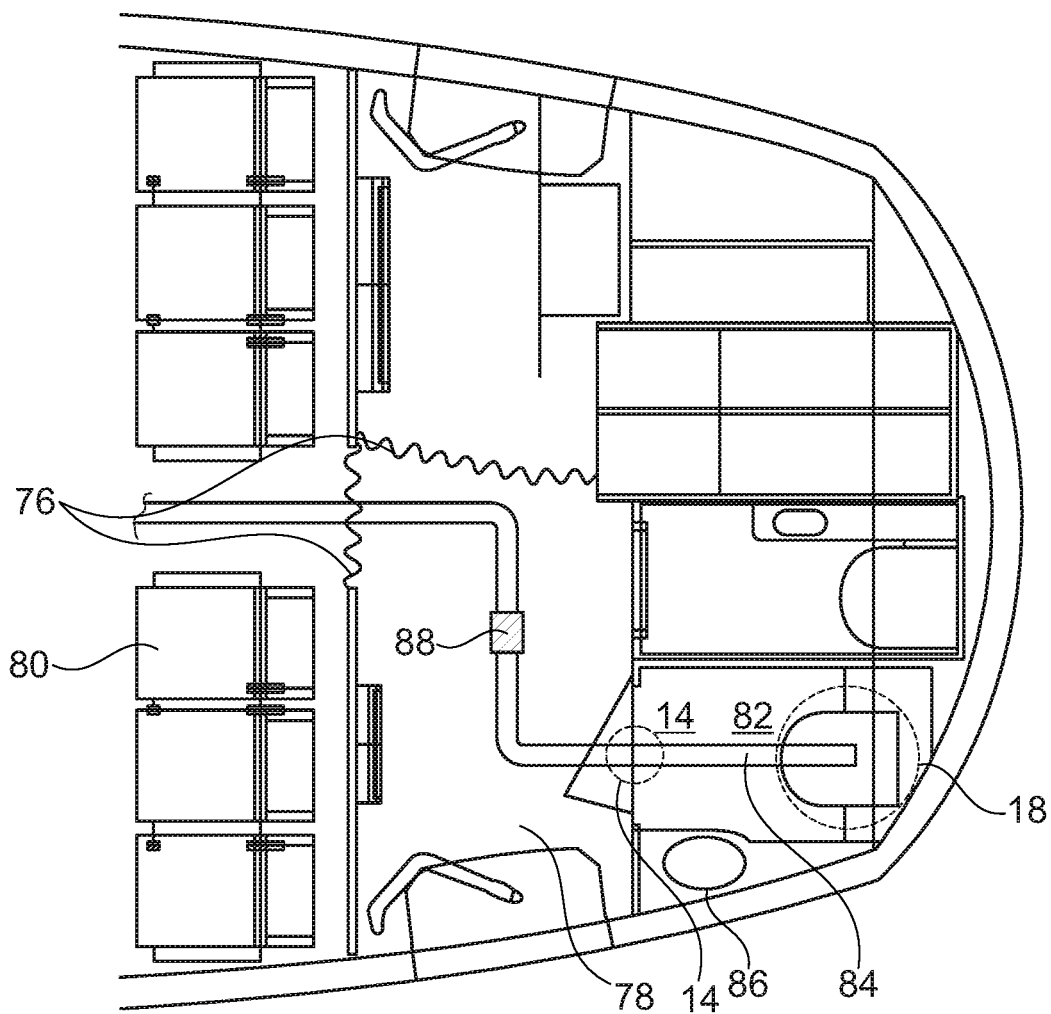
FIG. 5 shows a further example of an airplane's own mobility system in another example of a cabin segment.

FIG. 5 shows a further horizontal cut with an illustration of a plan view of a cabin area in the rear part of an aircraft, i.e. of an airplane. An entrance and exit area 78, serving as aisle area during the flight operation, is provided in the rear area, such that passengers can attain from the passenger seats 80 the onboard toilette spatial unit 82. The onboard toilette spatial unit 82 can be adapted, for example, with a rail 84 supporting the passenger carrying equipment 26, and extending in the ceiling area. For example, the rail 84 extends from the toilette using zone 18 via the entrance zone 14 into the aisle area in front of the onboard toilette 82. Therefrom, the rail 84 extends into the cabin area, in which the passenger seats 80 are arranged. The passenger with reduced mobility can be moved for using the toilette by this rail construction from the cabin area into the onboard toilette area.

FIG. 5 provides as further option that the onboard toilette spatial unit comprises a wash basin 86, wherein a passenger located in the seat device can use the wash basin, too, as already indicated previously in connection with FIG. 3. According to another option, the movement device comprises a moving equipment 88, which is movable in a horizontal direction, and by which the passenger carrying equipment 26 is supported. In other words, the moving equipment 88 can be moved along the rail. For example, the moving equipment comprises a movement unit 90.

Figure 6A:
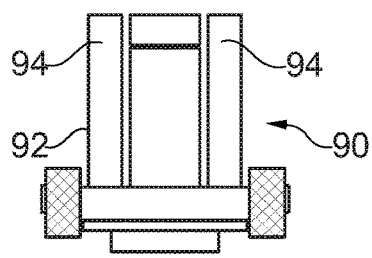
FIG. 6A shows a vertical section through an example of an automotive slide for the movement device.

FIG. 6A shows a schematic vertical section through the movement unit 90. The movement unit 90 is movable along the rail extending in the ceiling area. FIG. 6A shows as option to provide the movement unit as automotive slide 92 with an electric drive. Thereby, the slide 92 can comprise storage elements 94 for storing electric energy.

Figure 6C:
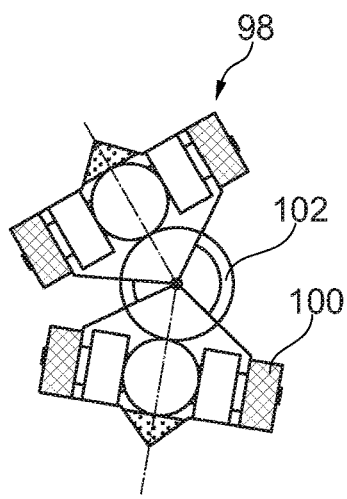
FIG. 6C is an illustration of the automotive slide from FIG. 6B during the use of a curve segment of a rail area.
Figure 6B:
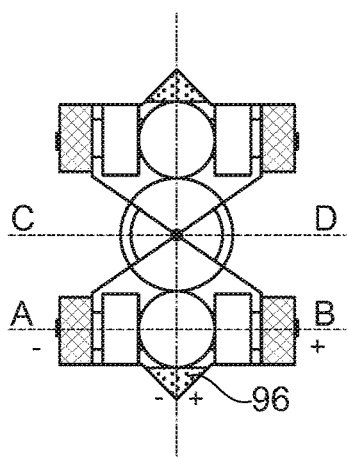
FIG. 6B is a first schematic top view of the automotive slide from FIG. 6A.

FIG. 6B shows in a schematic horizontal section an option, wherein the storage element 94 can be adapted with charging interfaces 96, which are at the endpoints of the rails in contact with current sources to charge the storage elements at least if required.

FIG. 6C shows in a schematic vertical section a further example, providing as option the automotive slide comprising a first pair of rolls 98 and a second pair of rolls 100, wherein a link segment 102 is provided between both pair of rolls. Therewith, the automotive slide can be moved along the rail through narrow curve radii areas, too. For example, the electric drive can comprise a self-locking gearing mechanism to provide sufficient steadiness.

FIG. 6C shows as an option to provide the movement unit as slide, which comprises two pairs of rolls whose axis are pivotably supported to each other via a middle part.

Figure 6D:
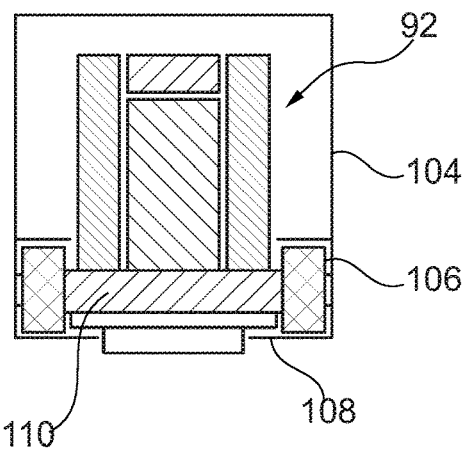
FIG. 6D shows the automotive slide of FIG. 6A in relation to a rail construction.

In FIG. 6D the automotive slide 92 is illustrated in a schematic vertical section within a rail profile 104, which is utilized as the rail 58. A drive channel 106 for both pair of rolls is provided in a lower area within the rail profile 104. An inwardly protruding projection of the lower rail segment 108 ensures in case of a defective axial device, for example if too heavily loaded, that a securing plate 110, provided therefore, is sufficiently supported in the rail.

FIG. 6C shows as further option, providing the movement unit as slide comprising two pairs of rolls between which a securing plate, for example securing plate 110, is provided, which is located in operation partially above inwards extending projections of a lower rail segment. The passenger carrying equipment is supported on the securing plate.

Figure 6E:
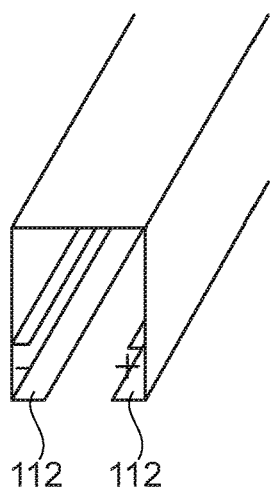
FIG. 6E shows a further example of a rail device with integrated electric supply.

FIG. 6E shows as further option wherein the rail can be electrified via first and second areas 112 to ensure the supplying of the automotive slide 92 with electric energy.

Figure 7:
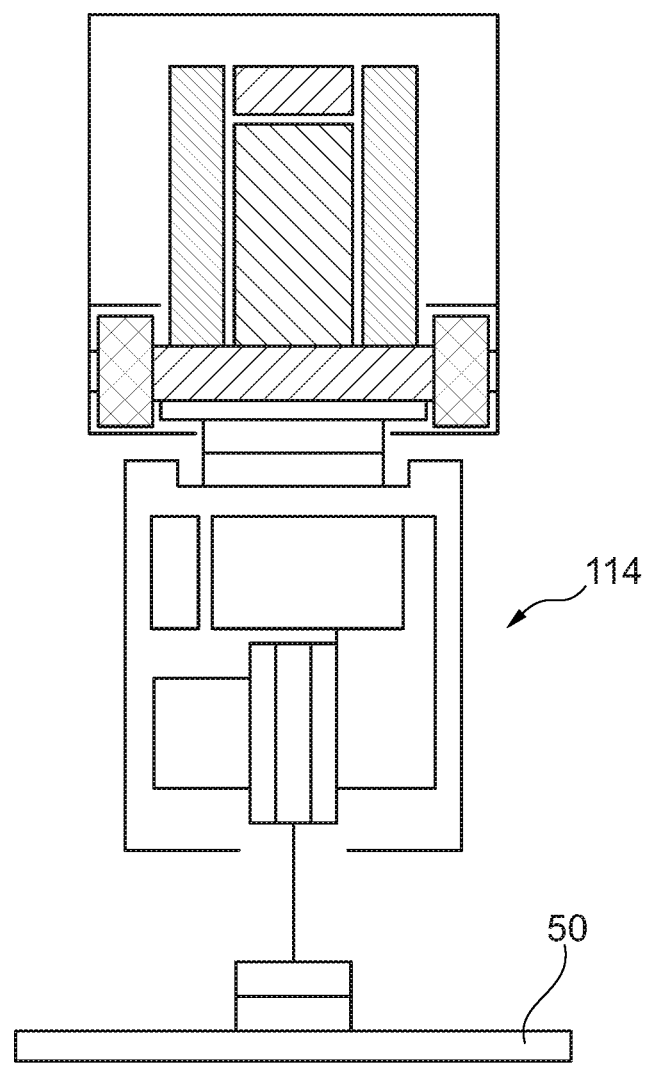
FIG. 7 shows an example of a lifting equipment of the movement device in a schematic vertical section.

FIG. 7 illustrated as option in a schematic illustration a lifting equipment 114 by which the seat device can be moved in height.

Figure 8:
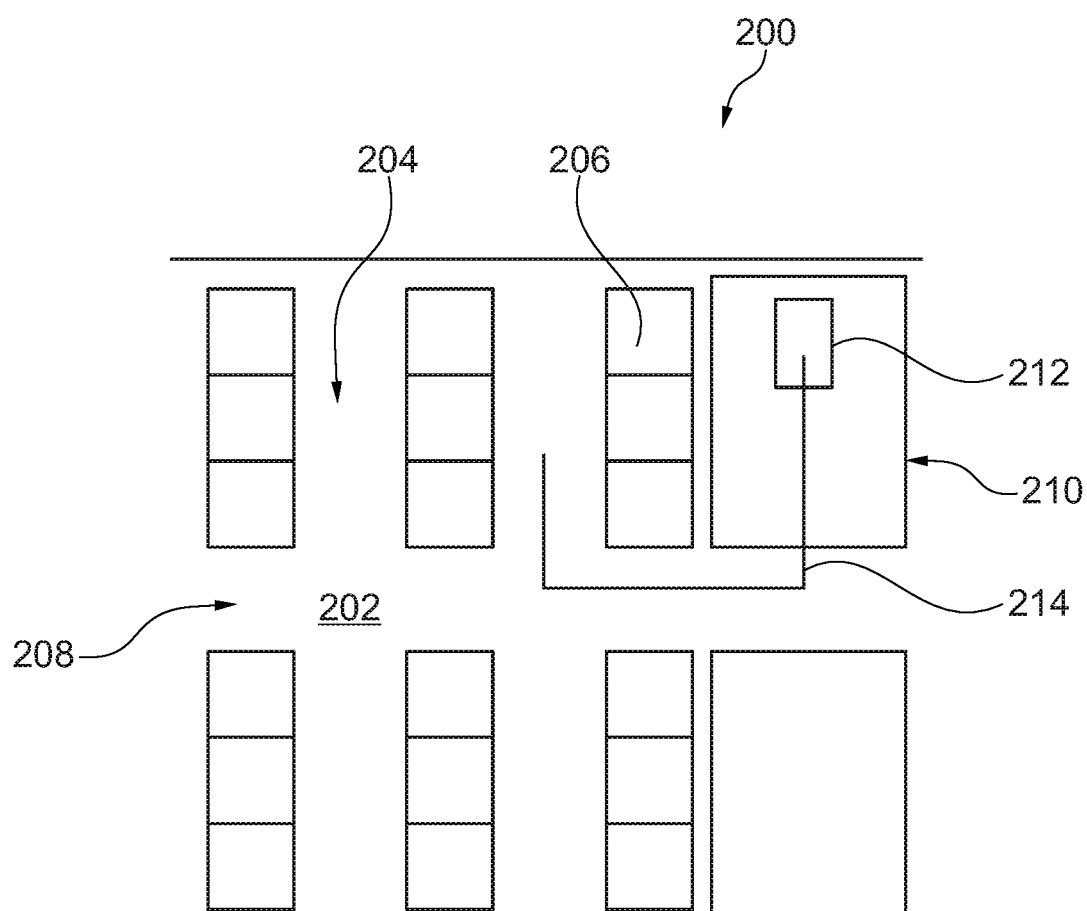
FIG. 8 is a horizontal section through an example of a cabin segment for an airplane.

FIG. 8 illustrates a cabin segment 200 for an airplane. The cabin segment 200 comprises at least a part of a lounge spatial unit 202 comprising a lounge area 204 with a plurality of passenger seats 206. Moreover, an aisle area 208 is provided for the movement of the passengers within the cabin segment 206. Furthermore, an onboard toilette spatial unit 210 with a toilette 212 is provided. An airplane's own mobility system according to one of the precedingly described examples is provided for the onboard toilette spatial unit 210. The airplane's own mobility system is indicated with a rail 214 which extends from an area of the passenger seats into the toilette space using zone. A passenger with reduced mobility is enabled by the airplane's own mobility system to use the toilette 212 during the stay in the cabin segment 200.

For example, the cabin segment is part of a cabin structure of an airplane, for example a passenger airplane.

Figure 9:
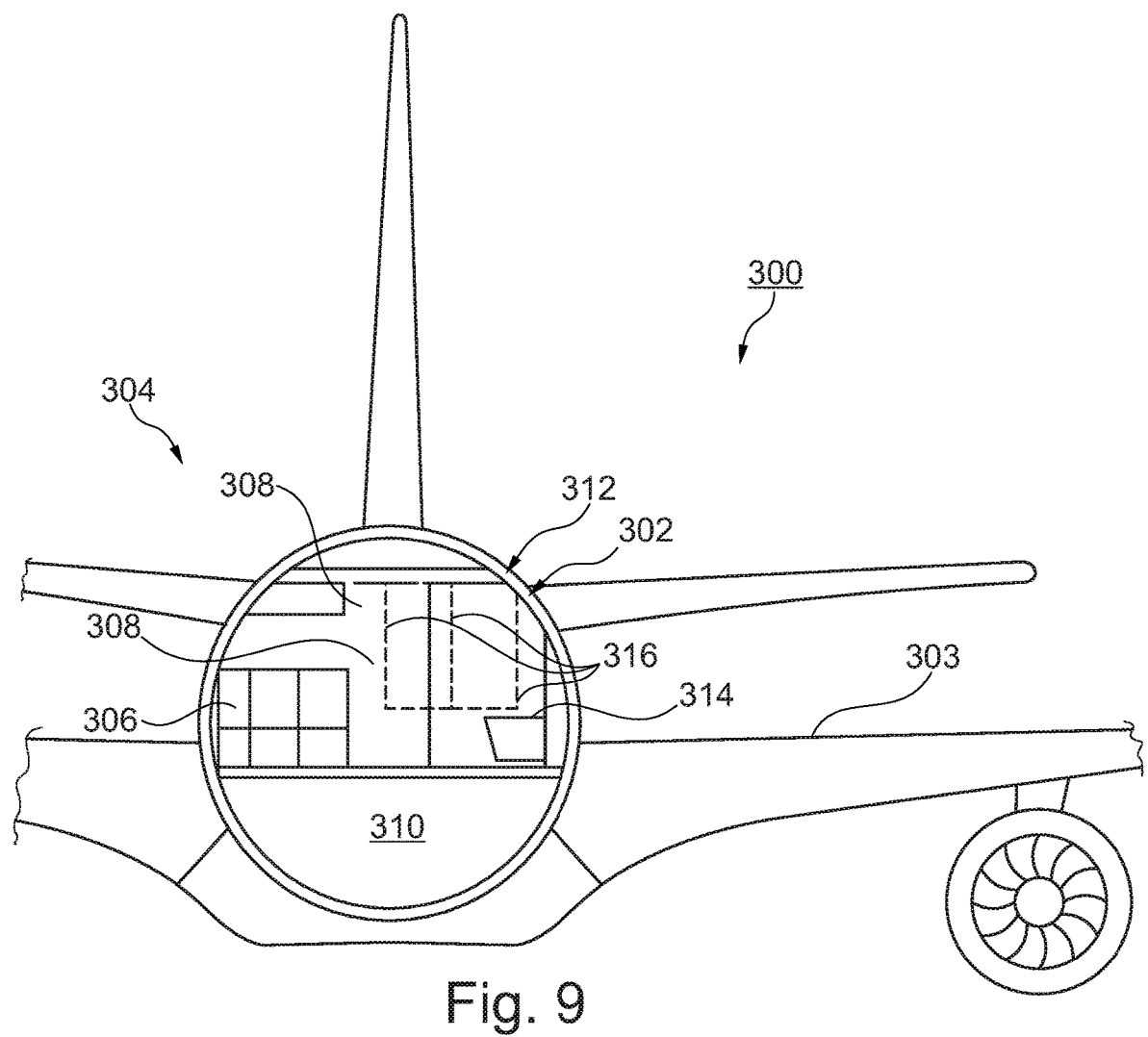
FIG. 9 is a cross-section through an airplane as example of an airplane.

FIG. 9 shows an airplane 300 with a fuselage construction 302 and lateral wings 303 (rudimentary illustrated). A lounge area 304 with a plurality of passenger seats 306 is provided in the airplane 300. For example, the lounge area 304 is a cabin area 308, which is arranged above a loading area 310. Both the cabin area 308 and the loading area 310 are in the fuselage, i.e. the fuselage construction 302. The cabin area 308 forms a part of the airplane's interior space. An airplane's own mobility system 312 according to one of the precedingly described examples is provided in the lounge area 304. A passenger with reduced mobility can use a toilette 314 with the airplane's own mobility system 312 during the stay on board of the airplane 300. The movement positions are indicated with broken vertical lines 316.

The exemplary embodiments described above may be combined in different ways. Additionally, it is noted that "comprising" or "including" does not exclude any other elements or steps and "a" or "an" does not exclude a multitude or plurality. It is further noted that features or steps which are described with reference to one of the above exemplary embodiments may also be used in combination with other features or steps of other exemplary embodiments described above. Reference signs in the claims are not to be construed as a limitation.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An airplane mobility system for passengers with reduced mobility, the airplane mobility system comprising:
   an onboard lavatory comprising:
   an entrance door; and
   a toilette; and
   a movement device comprising:
   a passenger carrying equipment, which is at least movable from proximate the entrance door to proximate the toilette and is supported in a ceiling of the onboard lavatory; and
   a rail in the ceiling of the onboard lavatory, in which the passenger carrying equipment is movably supported, wherein the rail extends in the ceiling at least from an area proximate the entrance door into an area proximate the toilette;
   wherein the passenger carrying equipment comprises a seat device enabling a passenger a seat like position;
   wherein the passenger is moveable back and forth with the movement device from proximate the entrance door to proximate the toilette for using the toilette;
   wherein the rail extends via the area proximate the entrance door into an aisle zone external to the onboard lavatory; and
   wherein the passenger carrying equipment is moveable into the aisle zone.

2. The mobility system according to claim 1, wherein:
   the rail in the ceiling extends from the aisle zone external to the onboard lavatory as far as to a cabin section, which has at least one passenger seat; and
   the passenger carrying equipment is movable into the cabin section.

3. The mobility system according to claim 1, wherein:
   the onboard lavatory comprises a water basin; and
   the water basin is usable by the passenger when located in the seat device.

4. The mobility system according to claim 1, wherein the movement device comprises a moving equipment, which can be moved in a horizontal direction, and by which the passenger carrying equipment is supported.

5. The mobility system according to claim 4, wherein the moving equipment comprises a movement unit, which is movable along a rail extending in the ceiling.

6. The mobility system according to claim 5, wherein the movement unit comprises a slide, which comprises two pairs of rolls whose axis are pivotably supported to each other via a middle part.

7. The mobility system according to claim 5, wherein:
   the movement unit comprises a slide, which comprises two pairs of rolls, between which a securing plate is provided, which is, in operation, located partially above inwardly extending projections of a lower rail segment; and the passenger carrying equipment is supported on the securing plate.

8. The mobility system according to claim 5, wherein:
the movement unit comprises an automotive slide with an electrical drive;
the slide comprises storage elements for storing energy; and
the storage elements are formed with charging interfaces, which are in contact with current sources at one or more end points of the rail to charge the storage elements, when required.

9. The mobility system according to claim 1, wherein the seat device is movably supported in height.

10. The mobility system according to claim 1, wherein the seat device comprises a seat loop equipment, which can be temporarily mounted around a passenger.

11. The mobility system according to claim 1, wherein the seat device comprises two anchoring devices for temporarily anchoring the seat device at two spaced bearing points provided in a floor area, at a seat structure, at a monument structure, and/or at a cabin wall.

12. A cabin segment for an airplane, comprising:
at least a portion of a lounge spatial unit comprising a lounge area with a plurality of passenger seats;
at least an aisle zone for movement of one or more passengers within the cabin segment;
an onboard lavatory comprising:
a toilette; and
an entrance door; and
an airplane mobility system for the onboard lavatory, the airplane mobility system comprising:
a movement device comprising:
a passenger carrying equipment, which is at least movable from proximate the entrance door to proximate the toilette and is supported in at least a ceiling of the onboard lavatory; and
a rail in the ceiling of the onboard lavatory, in which the passenger carrying equipment is movably supported, wherein the rail extends in the ceiling at least from an area proximate the entrance door into an area proximate the toilette;
wherein the passenger carrying equipment comprises a seat device enabling a passenger of the one or more passengers with reduced mobility a seat like position;
wherein the passenger is moveable back and forth with the movement device from proximate the entrance door to proximate the toilette for using the toilette;
wherein the rail extends via the area proximate the entrance door into an aisle zone external to the onboard lavatory;
wherein the passenger carrying equipment is moveable into the aisle zone; and
wherein the passenger is enabled by the airplane mobility system to use the toilette during a stay in the cabin segment.

13. An airplane comprising:
a lounge area with a plurality of passenger seats; and
an airplane mobility system for a passenger with reduced mobility, the airplane mobility system comprising:
an onboard lavatory comprising:
an entrance door; and
a toilette; and
a movement device comprising:
a passenger carrying equipment, which is at least movable from proximate the entrance door to proximate the toilette and is supported in at least a ceiling of the onboard lavatory; and
a rail in the ceiling of the onboard lavatory, in which the passenger carrying equipment is movably supported, wherein the rail extends in the ceiling at least from an area proximate the entrance door into an area proximate the toilette;
wherein the passenger carrying equipment comprises a seat device enabling the passenger with reduced mobility a seat like position;
wherein the movement device is configured to move the passenger with reduced mobility back and forth from proximate the entrance door to proximate the toilette to allow the passenger with reduced mobility to use the toilette;
wherein the rail extends via the area proximate the entrance door into an aisle zone external to the onboard lavatory;
wherein the passenger carrying equipment is moveable into the aisle zone; and
wherein the passenger with reduced mobility is enabled by the airplane mobility system to use the toilette during a stay in the lounge area.

14. The airplane according to claim 13, wherein:
the lounge area is formed by a cabin segment; and
the mobility system is arranged in the cabin segment.

* * * * *